April 18, 1933.                S. S. RATHBUN                1,904,530
                              POWER TRANSMISSION
                           Filed April 3, 1930         3 Sheets-Sheet 2

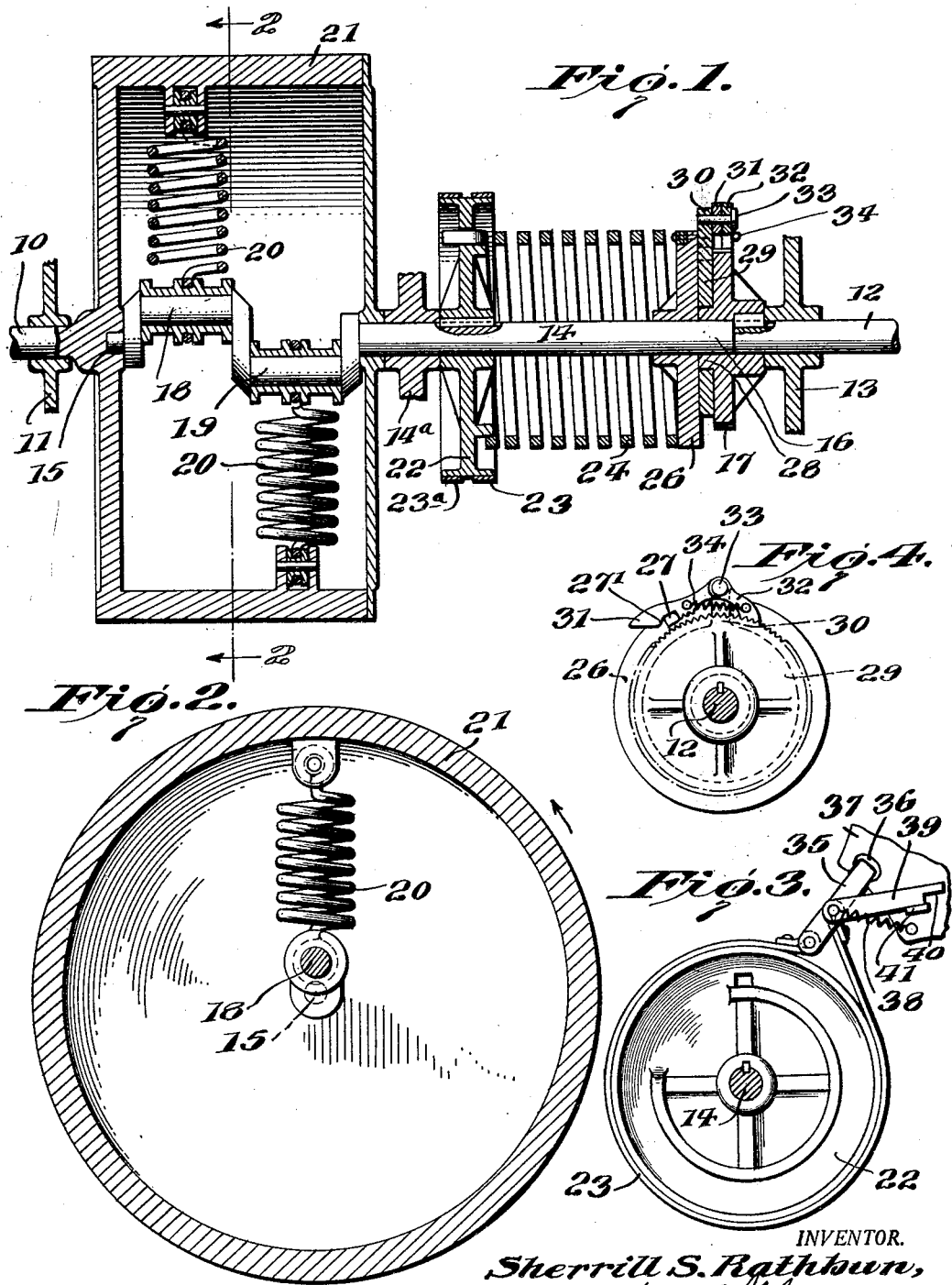

April 18, 1933. S. S. RATHBUN 1,904,530
POWER TRANSMISSION
Filed April 3, 1930 3 Sheets-Sheet 3
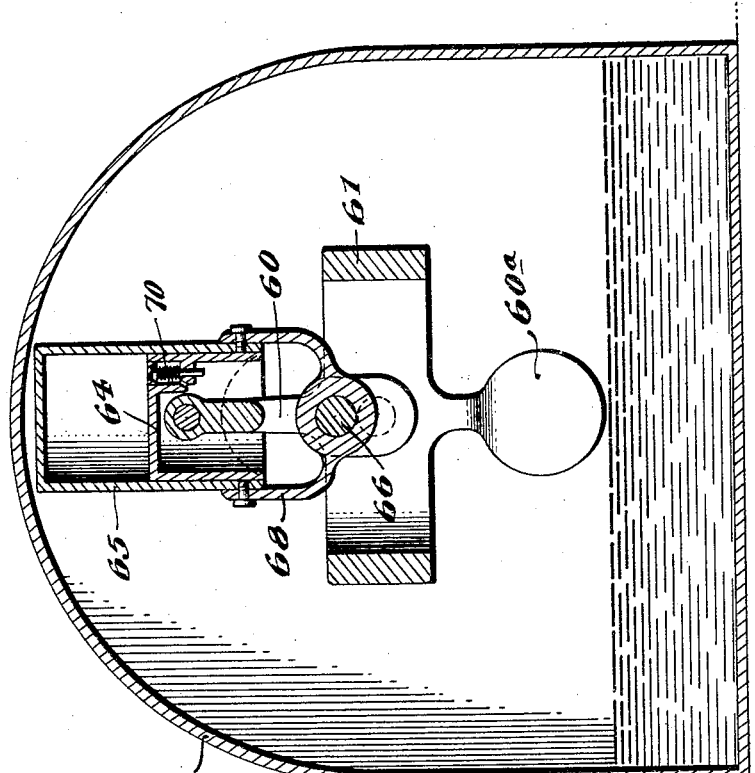
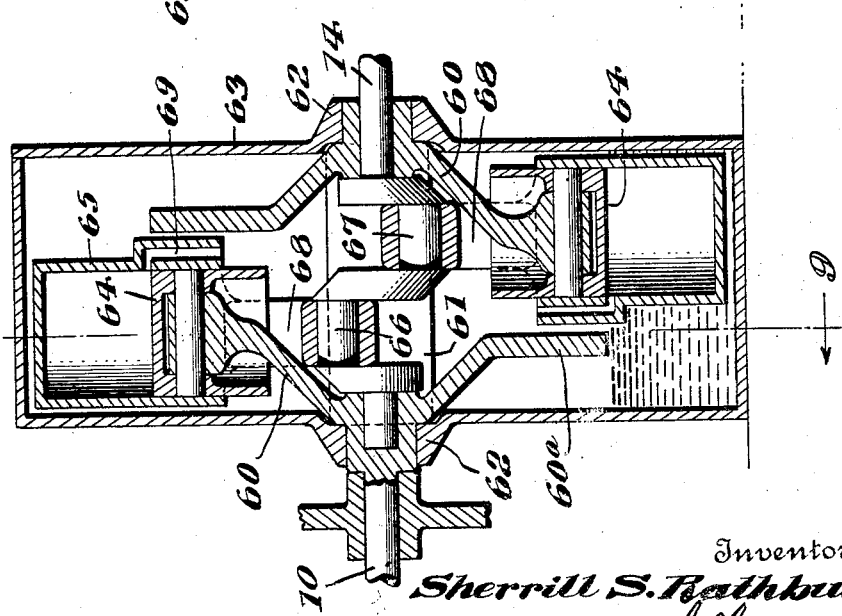
Inventor
Sherrill S. Rathbun,
By Attorney Patented Apr. 18, 1933

1,904,530

UNITED STATES PATENT OFFICE

SHERRILL S. RATHBUN, OF ROCKVILLE CENTER, NEW YORK

POWER TRANSMISSION

Application filed April 3, 1930. Serial No. 441,271.

The main object of my invention is to provide a means for coupling a driving member to a driven member so that the driven member may be started gradually without the requirement of reduction gears. It is obvious that in starting any driven device, as for instance a traction wheel of a motor vehicle, a maximum resistance is met at the very start, at which time a maximum torque at minimum speed is desired. For this purpose, in the forms shown, I employ between the driving and driven shaft a crank shaft with at least two resilient connections. The first is located between the driving shaft and one or more cranks of the intermediate shaft and serves to intermittently apply a gradually increasing and decreasing torque to the crank shaft. The second resilient connection is interposed between the crank shaft and the driven member and is made effective by the employment of one-way brakes or clutches on the intermediate shaft. This construction is capable of embodiment in a wide variety of mechanism and may be employed with reversing mechanism so that the driving member may rotate continually in one direction and the driven member may be rotated at will, either forward or backward.

The mechanism may also be used to rotate the driven shaft in the reverse direction without the use of reversing gearing. This is accomplished by utilizing the contracting impulses of the resilient members (which are secured to the crank shaft) when they exert a torque on the intermediate shaft in the opposite direction from that of the rotation of the driver.

The drawings are to be considered in the nature of illustrative diagrams of typical devices for carrying the invention into effect.

Referring to the drawings, wherein:

Fig. 1 is a longitudinal sectional view showing one form of mechanism embodying my invention.

Fig. 2 is a sectional view of the line 2—2 of Fig. 1.

Fig. 3 is a detail view of the one-way brake or clutch.

Fig. 4 is a detail view showing a ratchet connection between the torsion spring and driven shaft.

Fig. 5 is a longitudinal sectional view showing a modified form of construction permitting reversal of direction of application of power.

Fig. 6 is a detail transverse view of the reversing parts of mechanism for operating the same as shown in Fig. 5.

Fig. 7 is a detail view showing connection between the torsion spring and driven mechanism.

Fig. 8 is a longitudinal sectional view showing a pneumatic form of connection between the driving shaft and crank shaft.

Fig. 9 is a transverse sectional view on the line 9—9 of the form shown in Fig. 8.

In the form shown in Figs. 1, 2, 3, and 4 the driving shaft 10 is supported in a suitable bearing 11 while the driven shaft 12 is supported in a suitable bearing 13. Intermediate shaft 14 has one end 15 supported in the driving member and the other end 16 supported in a ratchet disc 17 keyed on the driven member 12. An intermediate bearing 14a is preferably employed between the cranks and the one-way brakes or clutches.

As clearly shown in the drawings the shaft 14 has cranks 18 and 19 each of which is connected by a spring member such as 20 to the fly wheel 21 which forms part of the driving member and may be in the form of a casing enclosing the cranks and springs.

On the shaft 14 is keyed a friction drum 22 having a brake band 23 forming a one-way brake or clutch so constructed and arranged as to permit the drum 22 to rotate in one direction only. A second brake band 23a is employed to control the rotation of the drum in the reverse direction.

A helical spring 24 has one end connected to the brake drum 22 and the other end connected to a slip connection consisting of a disc 26 having a lug 27 on the outer face thereof, this disc being capable of rotation upon the shaft 14.

The ratchet disc 17 is provided with a boss 28 which forms a bearing for a collar 29 provided with a lug 30. Pawls 31 and 32 respectively are secured upon the lug 30 by means of a pin 33 and are normally urged into engagement with the teeth of the ratchet disc 17 by means of the tension spring 34.

The brake bands 23 and 23a are associated with the exterior surface of the drum 22 and prevent rotation of the drum except in the direction desired.

As shown in Fig. 3 the band 23 is held in position by means of a lever 35 fulcrumed within an opening 36 in a support 37 and normally urged toward engagement with the drum 22 by means of a spring 38.

Pivotally connected to the lever 35 is an arm 39 having a notched end 40 for engagement with a lug 41. When it is desired to release the band, the member 39 is moved to bring notch 40 into engagement with the lug 41, thereby moving the lever 35 in a manner to urge the band away from the drum 22. It is clearly understood that both hands are equipped with the same mechanism, one permitting rotation in one direction, while the other permits rotation in the opposite, depending upon which arm and lever is operated.

In operation, to impart movement to shaft 12, (it being assumed that a load is applied thereto) power is transmitted to it from the fly wheel 21 which is rotated through the medium of the driver 10 in the direction indicated by the arrow in Fig. 2. A torque will thus be exerted by the crank springs 20 on the intermediate shaft 14, thus rotating it to gradually apply torsion to the torsion spring 24. As the torsion spring is wound, it reacts with an increasing torque at each end; tending to rotate the driven member 12 in the same direction as the driver at one end, and resisting the forward torque of the crank springs at the other end. This causes the crank springs to gradually elongate so that the driver advances relative to the intermediate shaft, while the intermediate shaft advances relative to the driven shaft.

This action continues until the point of maximum torque is reached. This point is somewhat before the driver has rotated 180° from its original position relative to the cranks i. e. somewhat before the dead center position. If, during this period the torsion spring 24 is wound 90°, the driver 10 will have rotated relative to a fixed point, somewhat less than 270° (90°+180°) when the position of maximum torque is reached. The torque then falls off to zero when the crank springs or members 20 have reached their greatest length (at the dead center position.)

After passing this dead center position, the crank springs exert a torque on the intermediate shaft in the opposite direction to that of the rotation of the driver, and the intermediate shaft would rotate in an opposite direction if it were not held against this reverse rotation by the one-way brake. In fact, the intermediate shaft would commence to rotate reversely as soon as the point of maximum torque was passed, if it were not for the one-way brake; because, as soon as the torque due to the crank springs decreases, the torque of the torsion springs overbalances that of the crank springs.

It can be readily understood that at the point of maximum torque, the torque may be several times that which the driver is able to exert continuously. However, since the torsion spring after being torsioned is held at this maximum torque, by the one-way brake, this maximum torque is continuously exerted on the driven shaft 12 so long as it is stationary when the driven shaft 12 begins to rotate slowly, the torque exerted on it will decrease slightly before the crank springs exert the next impulse and wind the torsion spring up to the maximum value again. Continued acceleration of the driven shaft 13 tends to unwind the torsion spring between impulses, thereby exerting less torque on the driven shaft.

In my devices, the average torque on the driven shaft may be made by the use of suitable springs, to equal the full load torque of the motor, when the speed of the driven shaft approximates that of the driver. Since the driver has to gain nearly 270° on the driven shaft while giving an impulse, this will mean that several revolutions of the driver occur during an impulse when the speed of the driven shaft is nearly the same as that of the driver. Under this condition there will not be enough kinetic energy in the fly wheel to wind the torsion spring to the point of maximum torque and the device therefore automatically partakes of a direct drive when the speed of the driven shaft 12 approximates that of the driving shaft 10.

When it is desired to rotate the shaft 12 in a reverse direction; in the form shown in Figs. 1, 2, 3 and 4 of the drawings, the bands 23 and 23a are manipulated to permit the rotation of the drum 22 in a reverse direction only. In this instance the fly wheel 21 is rotated in the same direction as in forward drive, thereby exerting the same torque on the intermediate shaft as before, but due to the changed application of the brake bands 23 and 23a (permitting only the reverse rotation of the drum 22), the intermediate shaft is rotated only when the crank springs 20 have become fully elongated, passed over the dead center position and begun to contract. The torsion spring in this case will then exert a torque in the reverse direction, due to the fact that it is wound in the reverse direction until the torque which it exerts upon the intermediate shaft, in the forward direction, is balanced by that exerted upon the said shaft in a reverse direction.

Continued rotation of the fly wheel 21 causes the torque, created by the crank springs 20, to decrease and become overbalanced by that of the torsion spring 24. It is readily understood, that the intermediate shaft would be rotated at this period in a forward direction but for the proper application of the one way brake, hence the crank shaft is held stationary for a period to permit the crank springs to pass the dead center position at which they are fully contracted then to be elongated, pass the other dead center position and give another reverse impulse.

Should the driven shaft 12 be held against rotation, the crank shaft will remain stationary continuously after the winding of the torsion spring regardless of the continued rotation of the fly wheel 21, but should the driven shaft 12 move a few degrees, between impulses, it will permit the winding of the torsion spring during impulses.

It is to be further understood that when the speed of the driven shaft increases from zero, when in reverse, the torque exerted on it decreases more rapidly than in forward drive.

In forward drive, when the speed of the driven shaft is approximately one-half (½) that of the driver, the torsion spring releases all of its stored energy before the fly wheel is in a position to impart a forward impulse i. e. while the springs 20 are exerting reverse torque on the driven shaft. If the torsion spring were rigidly attached to the driven shaft it would be wound in the reverse direction under this condition (i. e. while the reverse torque continues to be applied at the other end). I overcome this difficulty by providing slip connection means between the intermediate shaft and the driven shaft.

When in forward drive, the lug 27, which is secured to disc 26 is positioned in cooperating relation during impulses with the lug 30 carried by the collar 29. Between impulses there may be a space therebetween, dependent upon the speed of the driven shaft. When reverse operation is started, the lug 27 moves nearly a complete revolution and lifts pawl 31 and is held against further movement by notch 27' formed in the pawl. When lost motion tends to take place between the impulses, the pawl 31, lug 30 and pawl 32 are moved relative to the driven shaft and when the impulses follow they are imparted to the driven shaft by means of pawls 31 and 32 without any lost motion. The notch in pawl 31 is so formed as to release lug 27, to return to the forward drive position, when that rotation of the driven shaft is desired. When in reverse, the forward impulses do not pass further than the one-way brake, therefore, the lug 27 is held into engagement with the pawl 31. The spring 34 is of sufficient resiliency to hold the pawls in proper engagement during reverse rotation, but not of sufficient tension to resist forward impulses.

As shown in Figs. 5 and 6, a reversing means is provided, which operates to give the same torques and speeds in reverse as in direct drive and constitutes bevel gears 45 and 46, the gear 46 being formed with a brake drum 46a for a purpose hereinafter to be described. Interposed therebetween and in engagement with the gears 45 and 46 are pinions 47 mounted for rotation on a support 48. The bevel gears 45 and 46 are provided on their lower inner faces with clutch teeth 49 and 50 respectively for engagement with a clutch 51 slidably keyed to the shaft 14. Radial arms 52 extend through the support 48 and connect with a ring 53 carried by a stationary ring 54. A handle 55 having a yoke is connected with the ring 54 and serves to move the clutch gear 51 into engagement with either set of teeth 49 and 50 on the bevel gears as may be desired, thereby causing shaft 12 to be rotated in the desired direction.

When the reversing means is employed, as in this instance, the spring 24 is slidably secured to a disc 56 keyed to the shaft 12 and a spacing sleeve 56a may be employed between the gear 46 and disc 56 if desired.

This sleeve 56a at its ends furnishes abutment for the members 46 and 56 and the friction thus produced tends to dampen oscillation of the spring 24 which is of value chiefly during direct drive.

Preferably, the connection with the disc 56 is made for instance by a lug 57, so that the end 24a of the spring may have a limited freedom of movement with respect to the disc as will be hereinafter understood.

By using gears of different sizes set at various angles, any desired range of speeds in reverse may be obtained. A further advantage of this reversing means is that it acts as a clutch whereby the driving end and crank shaft may be completely disengaged from the driven end.

For forward operation the collar 51 is moved towards the torsion spring 24 and the brake 48a is preferably released, as the inertia of gears 47 and 48 and associated parts will have but little effect due to the "floating" action thus obtained. The cycle of operation is similar to that of my preferred form heretofore described. To change to reverse operation both one-way brakes are appiled to the drum 46a. This holds the crank shaft stationary. The collar 51 is then moved towards the fly wheel and the one-way brake allowing only forward motion is released. If the brake 48a is now in the released position, the "clutch out" condition is obtained. When this brake is engaged the driven shaft is rotated in the reverse direction, provided the one-way brake which allows reverse rotation only is in operation.

As the action on the crank shaft is the same as in forward operation (the forward impulses being used and changed into backward impulses by the gears) the same efficient operation is obtained in reverse as in forward operation and when the speed of the driven shaft approaches that of the driver, the impulses will be of such long duration that the fly wheel will not carry over the dead center position and direct drive starts so that the speed of the driven shaft will equal that of the driver.

To change back to forward drive both one-way brakes 80 and 81 are engaged (which holds the crank shaft stationary since brake 48a is already engaged), the collar 51 is then moved toward the driven end and forward drive will begin as soon as the one-way brake preventing forward motion is released.

If it is desired to obtain lower speed, either forward or in reverse, than is obtained by the operation heretofore described (in which forward impulses were used), it may be obtained by using the backward impulses. Low speed in reverse would be obtained by having the collar 51 engaged with gear 46 and using the one-way brake, allowing backward movement only. This action has been described in connection with Fig. 1. For low speed forward drive, the gears are arranged as for reverse drive, but the one-way brake allowing forward rotation only is used, so that the backward impulses on the crank shaft are utilized to produce forward motion of the driven shaft.

Figs. 8 and 9 show a modified form of the pneumatic type wherein the drive shaft 10 has connecting rods or arms 60 secured together by a yoke 61 in bearings 62 of the casing 63.

The arms 60 have secured thereto pistons 64 which coact with reciprocating cylinders 65. The cylinders 65 are secured to crank arms 66 and 67 by means of brackets 68 and have air ports 69 formed therein.

A relief valve 70 may be associated with the pistons 64 to permit the emission of any oil that may gather within the cylinder.

The casing 63 is provided with an oil reservoir or sump which permits of the employment of the usual splash type system of lubrication.

Counter-weights 60a are joined to the yoke 61 and serve to cooperate therewith and balance the pistons.

It is obvious, that if the crank shaft is held stationary, that movement of the drive shaft 10 imparts a rotary reciprocating movement to the cylinders, thereby tending to rotate the cranks 66 and 67. This tendency to rotate the cranks is due to the resilience of the air in the cylinders and to the centrifugal force of the cylinders. It is understood that shaft 14 of Figs. 8 and 9 will have a brake drum and actuate a driven shaft as before described.

It is to be distinctly understood that while I have described and illustrated several forms of my invention, that various changes and modifications may still be employed without departing from the spirit and scope of the appended claims.

I claim:

1. Power transmission comprising a driving shaft having a fly wheel, a driven shaft, an intermediate shaft, an intermittently operable connection carried within said fly wheel and secured to said intermediate shaft, an intermittently operable reversing ratchet means for the intermediate shaft and an intermittently operable resilient connection between the intermediate shaft and the driven shaft.

2. Power transmission having a driving shaft, a driven shaft, an intermediate shaft, an intermittently operable connection between the driving shaft and the intermediate shaft, an intermittently operable ratchet comprising a drum, brake bands associated with said drum in a manner to control the direction of rotation thereof, a disc secured to said driven shaft, and means secured to said drum for imparting movement to said disc whereby said driven shaft is rotated.

3. Power transmission comprising a driving shaft, a driven shaft, an intermediate shaft, means secured to said driving shaft for intermittently rotating said intermediate shaft, means secured to said intermediate shaft for permitting rotation of said shaft in one direction, a ratchet disc secured to said driven shaft and a resilient connection associated with said means and said driven shaft whereby said driven shaft is rotated.

4. A construction of the character described having a driving shaft, a driven shaft, an energy storing means comprising an intermediate shaft, crank arms for rotating said shaft, means connecting said arms and said driving member, a reversing member secured to said intermediate shaft, a slip connection means secured to said driven shaft and a resilient element connecting said reversing member and said slip connection means.

5. Power transmission comprising a driving shaft having a fly-wheel associated therewith, a driven shaft, an intermediate shaft with crank arms secured thereto, means intermittently operated connecting said flywheel and said crank arms, means connected to said intermediate shaft for governing the direction of rotation of said intermediate shaft and consisting of a brake drum having bands and means connected to said bands to insure intermittent connection between said drum and said driven shaft.

6. A construction of the character described comprising in combination, a driving element, a driven element and an energy storing mechanism connecting said elements together and consisting of a crank shaft, a ratchet brake capable of intermittent operation secured to said shaft, a disc rotatably mounted upon said shaft, a resilient member connecting said brake and said disc, a ratchet disc positioned in proximity to said first disc, and means interposed therebetween for connecting said discs together, whereby said driven element is rotated.

7. A construction of the character described comprising a driving shaft having a fly-wheel secured thereto, an intermediate shaft having crank arms positioned within said fly-wheel, resilient members connecting said fly-wheel to said crank arms, a brake drum having bands and secured to said intermediate shaft, either of said bands adapted to engage the surface of said drum to prevent rotation of the drum in one direction, a driven shaft located in proximity to said intermediate shaft, a slip connection means secured to said driven shaft, a torsion spring interposed between and secured to said brake drum and said connection means.

8. A construction of the character described comprising a driving shaft having a fly-wheel secured thereto, an intermediate shaft having crank arms positioned within said fly-wheel, resilient members connecting said fly-wheel to said crank arms, a brake drum having bands and secured to said intermediate shaft, either of said bands adapted to engage the surface of said drum to prevent rotation of the drum in one direction, a driven shaft located in proximity to said intermediate shaft, a slip connection means consisting of a disk having a lug, a ratchet disk having teeth, a collar interposed between said disks and provided with a lug for engagement with the lug of the first named disk, yielding pawls secured to one of said lugs and adapted to engage the teeth of said ratchet disk, one of said pawls capable of being disengaged from said ratchet upon engagement with one of said lugs and a torsion spring interposed between and secured to said brake drum and said connection means.

9. In a construction of the character described, a driving shaft, an intermediate shaft, a brake drum secured to said intermediate shaft, a driven shaft, a slip connection means consisting of a disk having a lug, a ratchet disk having teeth, a collar interposed between said disks and provided with a lug for engagement with the lug of the first named disk, pawls secured to said lug on said collar and adapted to engage the teeth of said ratchet disk, tension spring means for said pawls, one of said pawls capable of being disengaged from said ratchet upon engagement with the lug on said first mentioned disk and a torsion spring interposed between and secured to said brake drum and to the first mentioned disk of said slip connection means.

10. Power transmission mechanism comprising a driving shaft, a driven shaft, an intermediate shaft, an intermittently operable connection between the driving shaft and the intermediate shaft, spring means of connection between the intermediate and the driven shafts, comprising a member having a hub and rotatable with the intermediate shaft and a member having a hub rotatable with the driven shaft, a spring connecting said members and means interposed between said hubs for damping the oscillation of the spring.

SHERRILL S. RATHBUN.